United States Patent

Hata et al.

[11] Patent Number: 5,535,359
[45] Date of Patent: Jul. 9, 1996

[54] COMPUTER SYSTEM WITH CACHE MEMORY HAVING ADDRESS MASK REGISTER

[75] Inventors: Masayuki Hata; Hiromasa Nakagawa; Tatsuo Yamada, all of Itami, Japan

[73] Assignee: Mitsubishi Denki Kabushiki Kaisha, Hyugo-Ken, Japan

[21] Appl. No.: 387,980

[22] Filed: Feb. 13, 1995

(Under 37 CFR 1.47)

Related U.S. Application Data

[63] Continuation of Ser. No. 23,743, Feb. 26, 1993, abandoned, which is a continuation of Ser. No. 444,474, Dec. 1, 1989, abandoned.

[30]  Foreign Application Priority Data

Dec. 2, 1988 [JP] Japan ................................. 63-306531
Dec. 14, 1988 [JP] Japan ................................. 63-316930
Dec. 14, 1988 [JP] Japan ................................. 63-316931

[51] Int. Cl.[6] ................................................. G06F 12/08
[52] U.S. Cl. ..................... 395/446; 395/447; 395/421.11; 395/405
[58] Field of Search ........................... 364/200 MS File, 364/900 MS File; 395/400 MS File, 425 MS File, 446, 479

[56] References Cited

U.S. PATENT DOCUMENTS

| | | | |
|---|---|---|---|
| 4,055,851 | 10/1977 | Jenkins et al. | 364/200 |
| 4,574,346 | 3/1986 | Hartung | 395/425 |
| 4,885,680 | 12/1989 | Anthony et al. | 395/425 |
| 4,914,577 | 4/1990 | Stewart et al. | 364/200 |
| 4,959,777 | 9/1990 | Holman, Jr. | 395/425 |
| 4,996,641 | 2/1991 | Talgam et al. | 364/200 |
| 5,008,813 | 4/1991 | Crane et al. | 364/200 |
| 5,010,475 | 4/1991 | Hazawa | 364/200 |
| 5,056,041 | 10/1991 | Guttag et al. | 364/518 |
| 5,091,846 | 2/1992 | Sachs et al. | 395/250 |
| 5,091,850 | 2/1992 | Culley | 395/400 |
| 5,148,536 | 9/1992 | Witek et al. | 395/425 |
| 5,157,774 | 10/1992 | Culley | 395/425 |
| 5,163,142 | 11/1992 | Mageau | 395/425 |

*Primary Examiner*—Reba I. Elmore
*Attorney, Agent, or Firm*—Townsend and Townsend and Crew

[57]  ABSTRACT

A computer system is provided with a plurality of cache memories. Each cache memory stores data corresponding to part of main memory address space without overlapping with each other, thereby enabling capacity of the cache memory to be increased with ease. An address mask register is used to allocate the portion of main memory address space stored in each cache.

12 Claims, 5 Drawing Sheets

COMPUTER SYSTEM WITH CACHE MEMORY HAVING ADDRESS MASK REGISTER

This application is a continuation of U.S. patent application Ser. No. 08/023,743, filed Feb. 26, 1993, now abandoned, which was a continuation of U.S. patent application Ser. No. 07/444,474, filed Dec. 1, 1989, now abandoned, the disclosure of which are incorporated by reference herein.

BACKGROUND OF THE INVENTION

The present invention relates to a computer system, and more particularly to a computer system with a cache memory.

A main memory of a computer system stores large quantities of required data. A data processor gives an address signal to the main memory to access and use the data stored therein.

It is highly possible that the data requested by the data processor is then often repeatedly used. However, the data is read out from the main memory at each request at low speed. The repeated access reduces the processing speed of the entire system.

To address this circumstance, a system architecture has been popularized which temporarily stores the data once used by the data processor in a buffer memory, called the cache memory. Data to be accessed repetitively can be stored in the cache. The cache memory operates at high speed and has relatively small capacity so that, when again accessing the same data, the data is read out from the cache memory, thereby improving processing speed.

Figure 1:
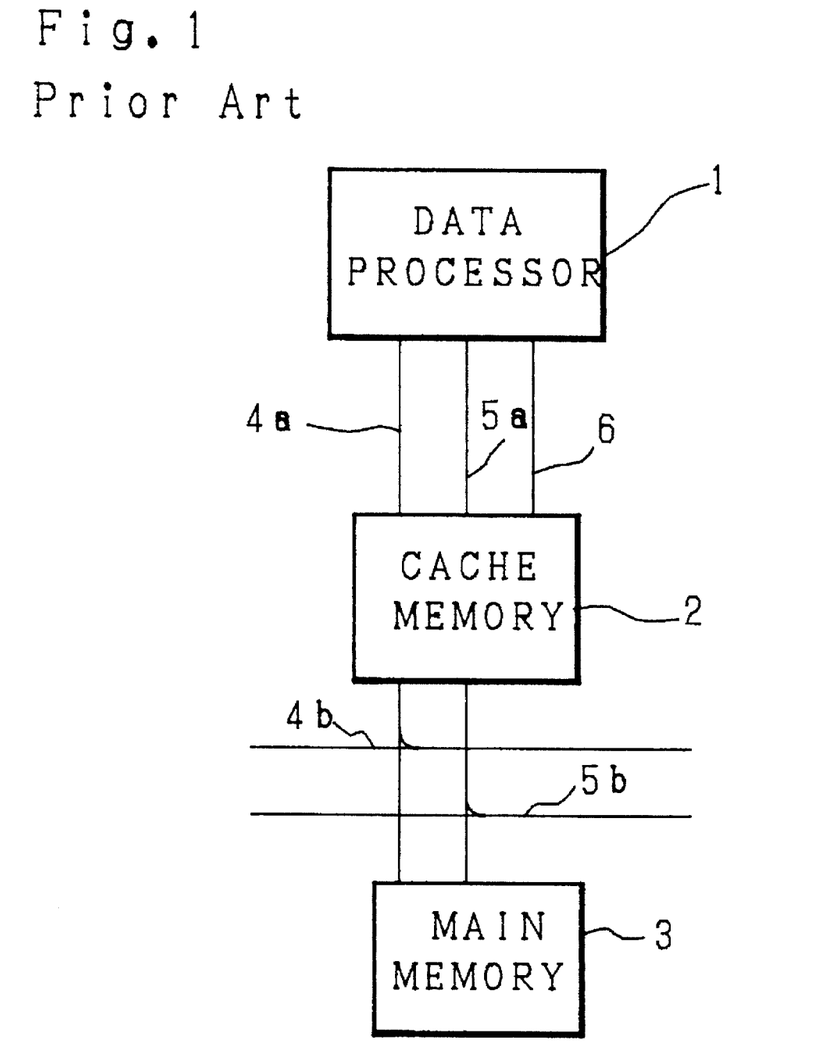
FIG. 1 is a block diagram showing the conventional computer system.

In the drawing, reference numeral 1 designates a data processor, which outputs an address signal through an address bus 4a to access data. Data processor 1 reads data received on a data bus 5a from a cache memory 2 to be discussed below, or a main memory 3. Data processor 1 outputs a non-cachable signal through a non-cachable signal line 6. The non-cachable signal is output from the data processor 1 to the cache memory when accessing data not held by cache memory 2.

Cache memory 2 is connected to data processor 1 through the aforesaid address bus 4a, data bus 5a and non-cachable signal line 6. Cache memory 2 outputs through an address bus 4b the address signal output from the data processor 1 so as to read in the data through a data bus 5b.

The main memory 3 is connected with the cache memory 2 through the address bus 4a and data bus 5b. The main memory 3 is of relatively larger capacity than cache memory 2, but operates at low speed. On the other hand, cache memory 2 is of relatively smaller capacity than main memory 3, but operates at high speed.

In operation, data processor 1 outputs via address bus 4a, an address signal indicating the address of data to be accessed at the main memory 3. This address signal is given to cache memory 2. When the address data is held in cache memory 2 (hereinafter called "cache hit"), cache memory 2 immediately outputs the data to the data processor 1 through the data processor 1 through the data bus 5a.

When the data to be accessed by the data processor 1 is not held in cache memory 2 (hereinafter called "cache miss"), cache memory 2 outputs, through address bus 4a, the address signal given from data processor 1 so as to access the data. Main memory 3 then outputs to data bus 5b the data corresponding to the address signal given from the cache memory 2. Cache memory 2 stores and holds therein the data output from main memory 3 (hereinafter called "caching") and gives the data to data processor 1 through data bus 5a.

In the case where data, in an I/O area or the like, is not desired to be held in cache memory 2, data processor 1 outputs the address to be accessed on address bus 4a and outputs the non-cachable signal on non-cachable signal line 6. Cache memory 2 outputs the address to address bus 4b to access to the I/O area of main memory 3 without deciding whether or not the data is to be accessed is cached. Cache Memory 2 also outputs the read-out data to data bus 5a without holding it, thereby giving the data to data processor.

Figure 2:
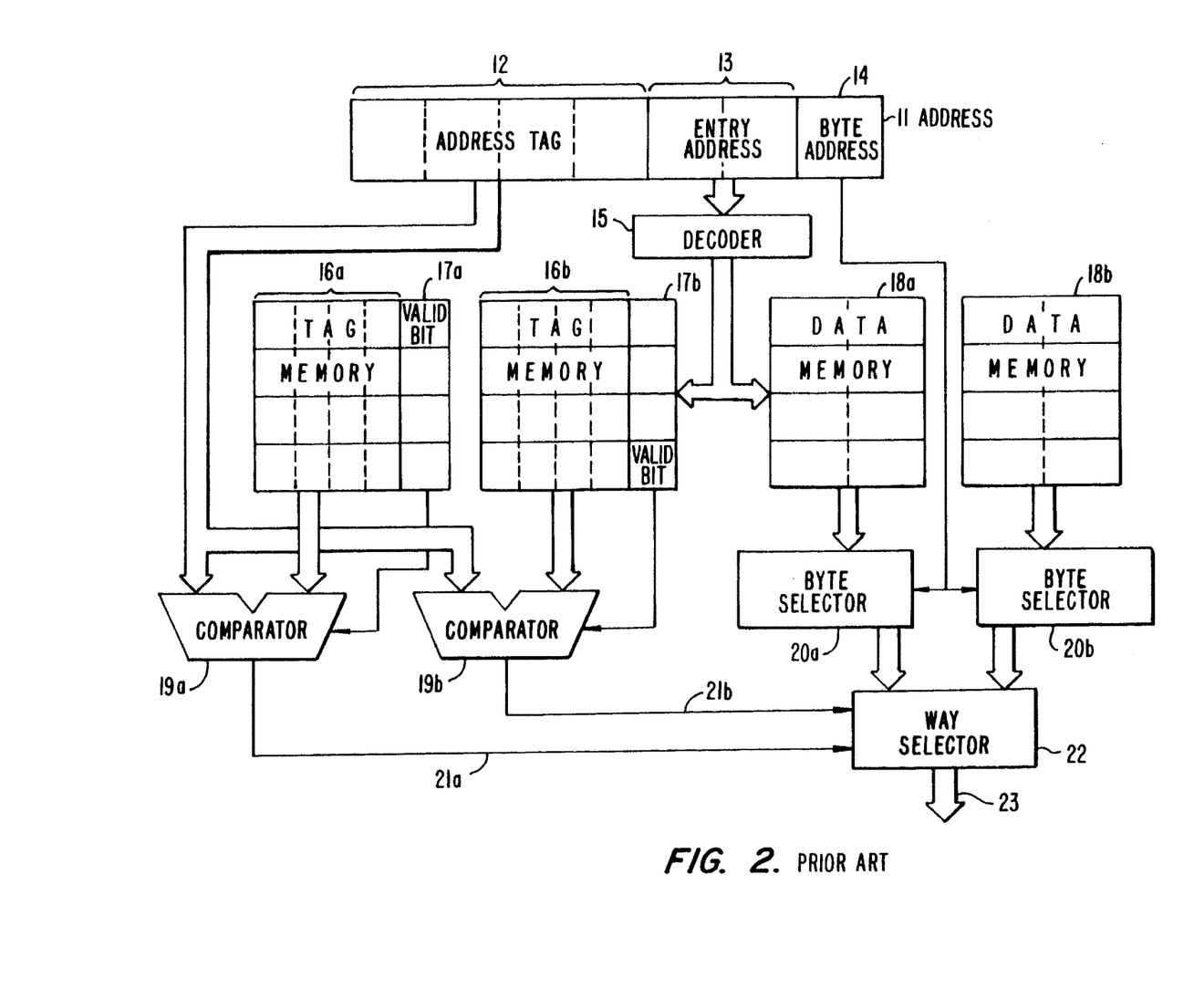
FIG. 2 is a block diagram showing a cache memory thereof.

FIG. 2 is a block diagram of the cache memory 2 of detailed structure, which is of 2-way set associative system, addresses of 7 bits, and 4-entries. In FIG. 2, reference numeral 11 designates an address which is output from the data processor 1 to address bus 4a as above-mentioned. Address 11 comprises an address tag 12 of 4 bits, an entry address 13 of 2 bits and a byte address 14 of 1 bit.

The contents of address tag 12 are given to comparators 19 (19a and 19b). The entry address 13 is given to a decoder 15, and the byte address 14 is given to byte selectors 20 (20a and 20b).

The decoder 15 decodes the entry address 13 of the address 11. The decoded result by the decoder 15 is given to the tag memories 16 (16a and 16b) and data memories 18 (18a and 18b).

The tag memories 16 (16a and 16b) store therein the address tag 12 of address 11. The stored content of tag memory 16a is output to comparator 19a. The stored content of tag memory 16b is output to comparator 19b.

Data memories 18 (18a and 18b) store therein two bytes of data indicated by the address stored in the tag memories 15. The stored content of data memory 18a is output to the byte selector 20a, and the contents of data memory 18b is output to the byte selector 20b.

Reference numerals 17 (17a and 17b) designate valid bits for indicating whether or not the stored contents of data memories 18 (18a and 18b) are effective. The content of valid bit 17a is output to the comparator 19a, and that of valid bit 17b to the comparator 19b.

The comparators 19 (19a and 19b) decide whether or not the address tag 12 and tag memories 16 (16a and 16b) are coincident of the content with each other. The decision result is given as hit signals 21 (21a and 21b) to a way selector 22.

The byte selectors 20 (20a and 20b) select byte data of data memories 18 (18a and 18b) in accordance with the content of byte address 14.

Subscripts "a" and "b" to reference numerals 16 through 21 show that they correspond to the two ways respectively.

The way selector 22 selects an output of byte selectors 20 by the hit signal 21, the selection result being output as a data output 23.

Cache memory 2 thus operates as described in the following paragraphs.

Upon receiving address 11 from data processor 1, entry address 13 of address 11 is decoded by decoder 15. The content of tag memory 16 of each way indicated by the above decoded result is given to comparators 19. The contents of data memories 18 are given to byte selectors 20, and byte data selected thereby is sent to way selector 22. The content of the selected tag memory 16 together with the contents of valid bits 17 of the selected tag memory 16 are judged by the comparators 19 as to whether or not the same coincides with address tag 12. When the coincident way exists, way selector 22 outputs data of that way as a data output 23. However, when the memory contents and address 12 compared by comparators 19, are not coincident, data accessing is executed not from cache memory 2 but from main memory 3. The corresponding data is read out from main memory 3 and given to data processor 1. The corresponding data is also stored in data memories 18 of cache memory 2.

In a conventional computer system having the above-mentioned construction, the capacity of the cache memory can only increase by increasing the size and capacity of the cache memory itself. Entire computer systems are generally composed of a single LSI chip. Therefore, increasing the capacity of cache memory requires fundamental redesign of the chip. Thus, the capacity of cache memory is not easily increased.

SUMMARY OF THE INVENTION

The present invention solves the above problem by providing a computer system with easily increasable of cache memory capacity.

The computer system of the present invention is provided with a plurality of cache memories so that the respective cache memories store therein data corresponding to part of address at the main memory without overlapping with each other. Such construction enables the capacity of cache memory to be increased with ease. The above and further objects and features of the invention will more fully be apparent from the following detailed description with accompanying drawings.

DESCRIPTION OF THE PREFERRED EMBODIMENTS

Next, embodiment of the present invention will be detailed in accordance with the drawings.

Figure 3:
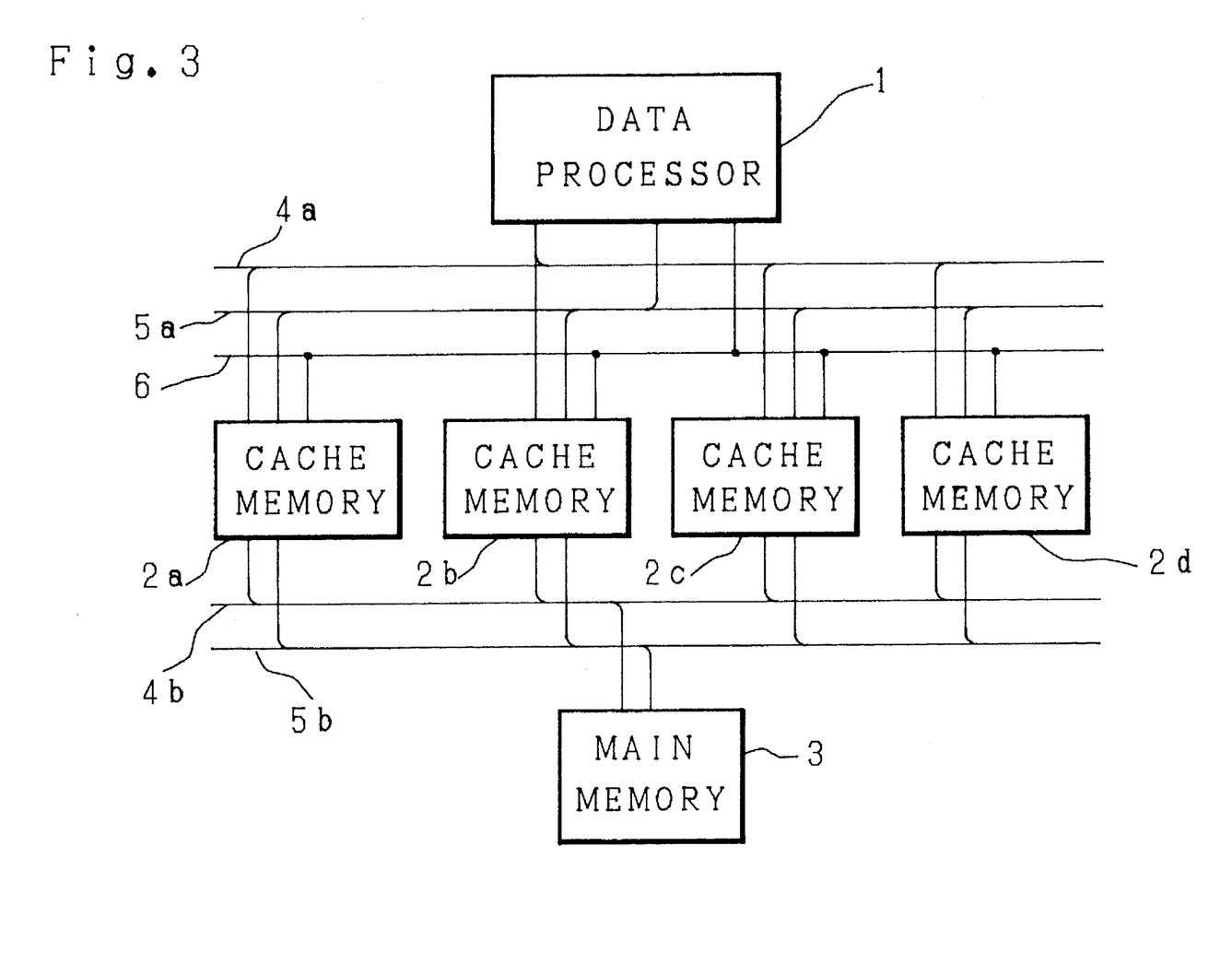
FIG. 3 is a block diagram showing a computer system of the present invention.

In FIG. 3, reference numeral 1 designates a data processor, which outputs an address signal through an address bus 4a to access data. Data processor, reads-in data read-out from cache memories (2a, 2b, 2c and 2d) or from a main memory 3 through a data bus 5a. Data processor 1 outputs a non-cachable signal through a non-cachable-signal line 6. The non-cachable signal is output from data processor 1 to cache memory 2 when accessing data not to be held at cache memory 2.

This embodiment of the present invention is provided with four cache memories 2a, 2b, 2c and 2d, which are connected to data processor 1 through the aforesaid address bus 4a, data bus 5a and non-cachable signal line 6. The cache memories output through an address bus 4b, address signals output from the data processor 1, and read-in data through a data bus 5b.

Main memory 3 is connected to cache memory 2 through address bus 4b and data bus 5b. In addition, main memory 3 is of relatively larger capacity than cache 2, but operates at low speed. On the other hand, the cache memories 2a, 2b, 2c and 2d are of relatively smaller capacity than main memory 3, but operates at high speed.

Figure 4:
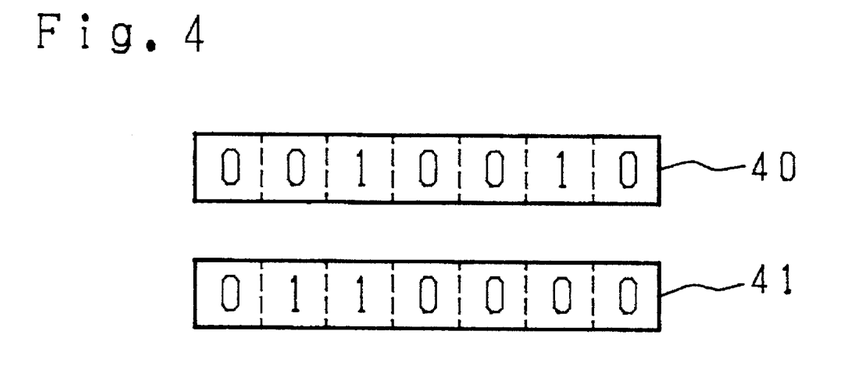
FIG. 4 is a typical structural view of means for allocating to a plurality of cache memories addresses of data to be stored therein respectively.

In FIG. 4, bit structures of an address register 40 and an address mask register 41 as means for storing address areas for caching by the cache memories 2a, 2b, 2c and 2d are shown. The address areas for caching by the cache memories 2a, 2b, 2c and 2d are included in a range resulting from masking the content of address register 40 with that of address mask register 41. For example, when the content of address register 40 is logical "0010010" and that of address mask register 41 is logical "0110000", an address of logical "*01****" (where the mark * is "don't care", that is, meaninglessness) becomes effective. Accordingly, the address areas specified by the address register 40 are logical "0010000" through "0011111" and "1010000" through "1011111". The cache memories 2a, 2b, 2c and 2d hold the address area data only.

The respective cache memories 2a, 2b, 2c and 2d set logical "0110000" to the address mask register 41. Cache memory 2a sets logical "0000000" to the address register 40. Cache memory 2b sets logical "0010000" thereto; cache memory 2c sets logical "0100000" and cache memory 2d sets logical "0110000". The caching address areas are thereby not overlapped.

Concretely, the caching areas of cache memory 2a are in ranges of logical "0000000" through "0001111" and "1000000" through "1001111"; those of cache memory 2b, "0010000" through "0011111" and "1010000" through "1011111"; those of cache memory 2c, "0100000" through "0101111" and "1100000" through "1101111"; and those of cache memory 2d, "0110000" through "0111111" and "1110000" through "1111111".

Accordingly, four cache memories of capacity equal to that of one cache memory used in the conventional example are used to allocate addresses to be cached without overlapping with each other, resulting in that the capacity of cache memory increases as a whole.

The computer system of the present invention having a cache as described above operates as herein described. Data processor 1 outputs through address bus 4a and address signal indicating the address of data to be accessed at the main memory 3. The address signal is given to cache memories 2a, 2b, 2c and 2d. In the case where the data of the address is held at any cache memory 2a, 2b, 2c or 2d, the cache memory 2a (or 2b, 2c or 2d) immediately outputs the data to data processor 1 through data bus 5a.

In the case where the data to be accessed by data processor 1 is not held at any cache memory 2a, 2b, 2c or 2d, the address signal given from data processor 1 is output to address bus 4b so as to access the data from main memory 3. Main memory 3 outputs to data bus 5b data corresponding to the given address signal. The cache memory 2a (or 2b, 2c or 2d) whose address register 40 is set so as to store the address area corresponding to the data address stores and holds the data output from main memory 3, and gives the data to data processor 1 through data bus 5a. The computer system of the present invention therefore sets the bits of address register 40 and address mask register 41 so as to specify part of address area at main memory 3 without overlapping with each other, thereby enabling the capacity of cache memory to increase easily and arbitrarily.

Although the above-mentioned embodiment is provided with four cache memories 2a, 2b, 2c and 2d, the present invention is not limited thereto. Since the computer system of the present invention can use the cache memories connected arbitrarily in plural, the capacity of cache memory can easily and arbitrarily be increased.

In a case where data processor 1 cannot identify an I/O area, processor 1 cannot output the non-cachable signal. When such a data processor is used, cache memory 2 is constructed as shown in FIG. 5 to solve this problem.

Figure 5:
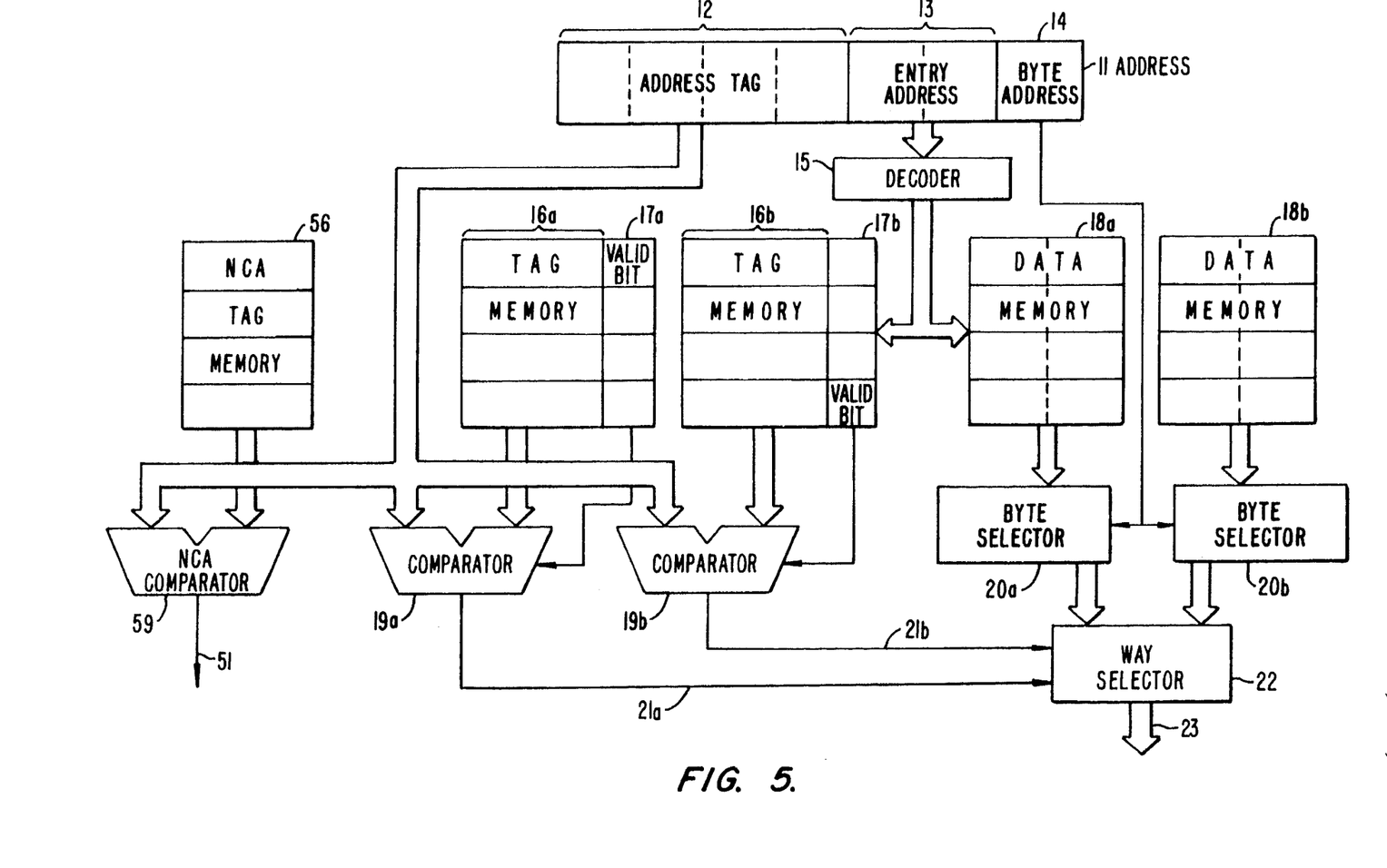
FIG. 5 is a block diagram showing a modified example of the cache memory.

In FIG. 5, reference numeral 56 designates an NCA tag memory, 59 designates an NCA comparator, and 51 designates an NCA signal as the output signal of the NCA comparator 59. Other constructions are the same as the conventional cache memory shown in FIG. 2.

The NCA (non-cachable address) tag memory 56 stores therein non-cachable address, that is, address not to be cached in the cache memory 2. The stored content of NCA tag memory 56 is given to the NCA comparator 59. The NCA comparator 59, other than being given the stored content of the NCA tag memory 56 as above-mentioned, is also given the content of the address tag 12 so as to judge whether or not both the two inputs coincide with each other. The result of judgment is output as the NCA signal 51. When the NCA signal 51 is output, writing to the data memory 18 from the main memory 3, in other words, caching, is forbidden.

When data processor 1 outputs address 11, the stored content of the NCA tag memory 56 indicated by entry address 13 is output to NCA comparator 59. Also, the content of tag memory 16 of each way shown by entry address 13 is given to a comparator 19 and the content of data memory 18 to a byte selector 20, the byte data selected thereby is being sent to a way selector 22.

The content of selected tag memory 16 together with the content of valid bit 17 at selected tag memory 16 is judged by the comparator 19 as to whether or not the same is coincident with an address tag 12 in the address 11 outputted from data processor 1. When a coincident way exists, way selector 22 outputs its way data as a data output 23. When not-coincident, accessing is executed not from the cache memory 2 but from main memory 3. The corresponding data is given to data processor 1 and stored in data memory 18 of cache memory 2.

At this time, however, NCA comparator 59 is given the content of address tag 12 so as to compare both the data. When the comparison results are coincident with each other, NCA signal 1 is output, whereby no data from the main memory 3 is written to data memory 18.

The number of memory elements of tag memory 16 increases in direct proportion to the number of data holdable by data memory 18, thereby occurring the problem as hardware quantity increases. This problem can be solved by constructing each cache memory as shown in FIG. 6.

Figure 6:
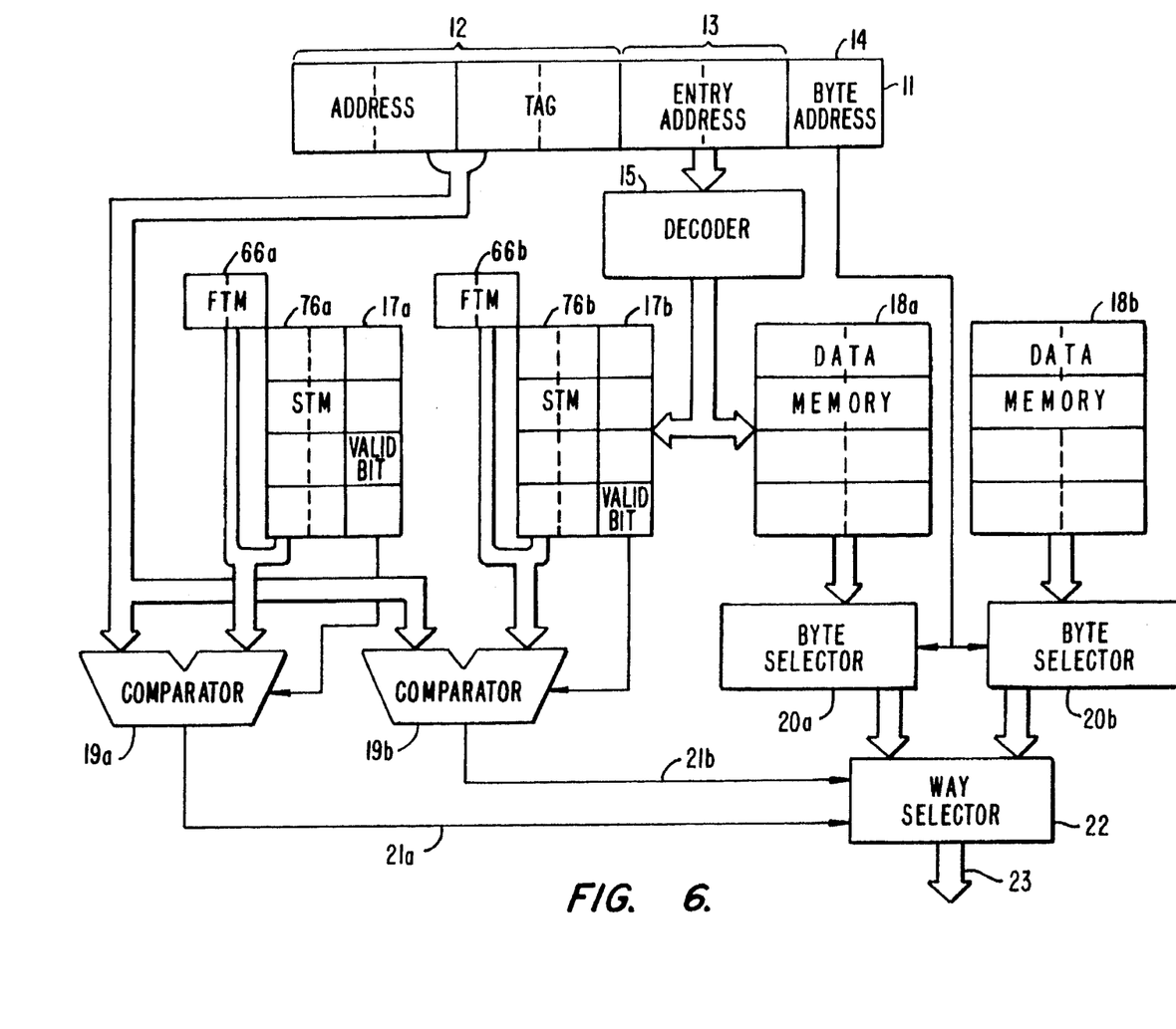
FIG. 6 is a block diagram showing another modified example of the cache memory.

In a structural example of the cache memory shown in FIG. 6, tag memories 16 (16a and 16b) of 4 bits as shown in FIG. 2 or 5 are divided into two upper bits and two lower bits. The two upper bits are expected to reduce the hardware quantity. First tag memories 66 (66a and 66b) have two bits in common. The two lower bits are formed of second tag memories 76 (76a and 76b) which correspond to the number of data which can be stored in data memory 18, as in the conventional example. The contents of the first tag memories 66 (66a and 66b) and the second tag memories 76 (76a and 76b) are adapted to be given to the comparator 19. Dividing the tag memories in a plurality of stages can reduce the hardware quantity, thereby enabling the data memory to increase in capacity to that extent.

As this invention may be embodied in several forms without departing from the spirit of essential characteristics thereof, the present embodiment is therefore illustrative and not restrictive, the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. In a computer system having a CPU, a main memory, a data bus and an address bus, a cache architecture comprising:

a plurality of set associative cache memories wherein each of said plurality of set associative cache memories is coupled to the address bus for receiving a main memory address having at least a TAG portion;

each of said plurality of set associative cache memories having:
  (a) an address storage means including:
    (i) a programmable address register for storing said main memory address, said programmable address register having an address value; and
    (ii) a programmable address mask register coupled to said programmable address register and having a masked value, said programmable address mask register outputting a masked TAG address corresponding to said masked value and said address value of said programmable address register, said masked TAG address masking bits in at least said TAG portion of said main memory address to establish a set of TAG addresses defining data to be cached and wherein the address value of each programmable address register is correlated with the masked value of each programmable address mask register such that each one of said plurality of set associative cache memories stores a different set of TAG addresses than any remaining ones of said plurality of set associative cache memories;
  (b) a TAG memory, coupled to said address storage means, having a plurality of TAG storage locations for storing said set of TAG addresses;
  (c) a data memory, coupled to said TAG memory and to the data bus, and having a plurality of storage locations, wherein each storage location corresponds to a TAG location of one of the TAG storage locations in the TAG memory; and
  (d) means, coupled to the data bus and to said data memory, for outputting to the data bus a data word stored at a data location corresponding to said TAG location when said TAG location corresponds to the TAG portion of said main memory address.

2. The cache architecture of claim 1 wherein the TAG portion of main memory address is m bits long, a valid bit portion of main memory address is k bits long and wherein the TAG memory of at least one of said plurality of set associative cache memories comprises:

a single first TAG memory of n bits, coupled to means for outputting wherein n is equal to the number of most significant bits in the TAG portion of main memory address and wherein n is less than m; and $2^k$ second TAG memories coupled to said means for outputting.

3. The cache architecture of claim 1 wherein at least one of said plurality of set associative cache memories further comprises:
a noncacheable TAG memory, coupled to said address storage means, for storing a plurality of TAG addresses not to be stored in the plurality of set associative cache memories.

4. The cache architecture of claim 1 wherein each of said plurality of set associative cache memories further comprises:
means, coupled to said address storage means, for comparing said main memory address received on said address bus with said masked TAG address; and
wherein when said main memory address coincides with said masked TAG address, the TAG portion of the main memory address is not stored in the TAG memory of the cache memory.

5. In a computer system having a CPU, a main memory, a data bus and an address bus, a cache architecture comprising:
a plurality of set associative cache memories wherein each of said plurality of set associative cache memories is coupled to the address bus for receiving a main memory address having at least a TAG portion;
each of said plurality of set associative cache memories having:
(a) an address storage means including:
(i) a programmable address register for storing said main memory address, said programmable address register having an address value; and
(ii) a programmable address mask register coupled to said programmable address register and having a masked value, said programmable address mask register outputting a masked TAG address corresponding to said masked value and said address value of said programmable address register, said masked TAG address masking bits in at least said TAG portion of said main memory address to establish a set of TAG addresses defining data to be cached and wherein the address value of each programmable address register is correlated with the masked value of each programmable address mask register such that each one of said plurality of set associative cache memories stores a different set of TAG addresses than any remaining ones of said plurality of set associative cache memories;
(b) a TAG memory coupled to said address storage means having a plurality of TAG storage locations for storing said set of TAG addresses;
(c) a data memory, coupled to said TAG memory and to the data bus, and having a plurality of storage locations, wherein each storage location corresponds to a TAG location of one of the TAG storage locations in said TAG memory; and
wherein when said main memory address coincides with said masked TAG address, the TAG portion of the main memory address is not stored in the TAG memory of the cache memory.

6. The cache architecture of claim 5 wherein the TAG portion of main memory address is m bits long, a valid bit portion of main memory address is k bits long and wherein the TAG memory of at least one of said plurality of set associative cache memories comprises:
a single first TAG memory of n bits wherein n is equal to the number of most significant bits in the TAG portion of main memory address and wherein n is less than m; and $2^k$ second TAG memories for storing at least remaining bits of said TAG portion of main memory address.

7. The cache architecture of claim 5, wherein at least one of said plurality of set associative cache memories further comprises:
a noncacheable TAG memory, coupled to said address storage means, for storing a plurality of TAG addresses not to be stored in the plurality of set associative cache memories.

8. The cache architecture of claim 5, further comprising:
means, coupled to said address storage means, for comparing said main memory address received on said address bus with said masked address.

9. A cache architecture, for a cache memory in a computer system having a CPU, a main memory, a data bus and an address bus, comprising:
address storage means coupled to the address bus for indicating a subset of all address spaces indicated by the CPU;
a TAG memory coupled to said address storage means for storing a plurality of TAG addresses, wherein said plurality of TAG addresses are addresses of address spaces indicated by said address storage means;
a data memory, coupled to thee data bus, for storing data of the main memory indicated by the plurality of TAG addresses stored in said TAG memory;
wherein a TAG portion of address is m bits long, a valid bit portion of address is k bits long and wherein the TAG memory comprises:
a single first TAG memory of n bits wherein n is equal to a number of most significant bits in a TAG address field and wherein n is less than m; and
$2^k$ second TAG memories for storing at least remaining bits of said TAG address field.

10. A cache architecture, for a cache memory in a computer system having a CPU, a main memory, a data bus and an address bus, comprising:
address storage means coupled to the address bus for indicating a subset of all address spaces indicated by the CPU;
a TAG memory coupled to said address storage means for storing a plurality of TAG addresses, wherein said plurality of TAG addresses are addresses of address spaces indicated by said address storage means;
a data memory, coupled to the data bus, for storing data of the main memory indicated by the plurality of TAG addresses stored in said TAG memory;
wherein the cache memory comprises:
a noncacheable TAG memory, coupled to said address storage means, for storing a plurality of TAG addresses not to be stored in the cache memory.

11. A cache architecture, for a cache memory in a computer system having a CPU, a main memory, a data bus and an address bus, comprising:
address storage means coupled to the address bus for indicating a subset of all address spaces indicated by the CPU;
a TAG memory coupled to said address storage means for storing a plurality of TAG addresses, wherein said plurality of TAG addresses are addresses of a set of address spaces other than said subset of all address spaces of said address storage means;
a data memory, coupled to a data bus, for storing data of a main memory indicated by the plurality of TAG addresses stored in said TAG memory;

wherein a TAG portion of address is m bits long, a valid bit portion of address is k bits long and wherein the TAG memory comprises:

a single first TAG memory of n bits wherein n is equal to a number of most significant bits in a TAG address field and wherein n is less than m; and $2^k$ second TAG memories for storing at least remaining bits of said TAG address field.

12. A cache architecture, for a cache memory in a computer system having a CPU, a main memory, a data bus and an address bus, comprising:

address storage means coupled to the address bus for indicating a subset of all address spaces indicated by the CPU;

a TAG memory coupled to said address storage means for storing a plurality of TAG addresses, wherein said plurality of TAG addresses are addresses of a set of address spaces other than said subset of all address spaces of said address storage means; and a data memory, coupled to a data bus, for storing data of a main memory indicated by the plurality of TAG addresses stored in said TAG memory;

wherein the cache memory further comprises:

a noncacheable TAG memory, coupled to said address storage means, for storing a plurality of TAG addresses not to be stored in the cache memory.

* * * * *